United States Patent [19]

Fecher

[11] Patent Number: 5,207,770
[45] Date of Patent: May 4, 1993

[54] MODIFIER FOR VACUUM BOOSTER REACTION FORCE

[75] Inventor: Douglas A. Fecher, Granger, Ind.

[73] Assignee: Allied-Signal Inc., Morristown, N.J.

[21] Appl. No.: 827,668

[22] Filed: Jan. 29, 1992

[51] Int. Cl.⁵ .............................................. F15B 9/10
[52] U.S. Cl. .............................. 91/369.4; 91/376 R; 303/12
[58] Field of Search ................. 91/369.1, 369.2, 369.3, 91/369.4, 376 R, 389; 303/12, 114.3

[56] References Cited

U.S. PATENT DOCUMENTS

| | | | |
|---|---|---|---|
| 2,790,306 | 4/1957 | Ingres | 91/369.4 |
| 3,110,031 | 11/1963 | Price | 91/376 R X |
| 3,149,539 | 9/1964 | Prather | 91/369 Z |
| 4,354,423 | 10/1982 | Ohmi et al. | 91/376 R X |
| 4,493,243 | 1/1985 | Horibe | 91/376 R X |
| 4,690,034 | 9/1987 | Ando et al. | 91/369 Z |
| 4,718,327 | 1/1988 | Myers | 91/370 X |
| 4,953,446 | 9/1990 | Fecher et al. | 91/369.1 X |
| 5,117,738 | 6/1992 | Horner, Jr. | 91/369.1 |
| 5,161,451 | 11/1992 | Fecher | 91/376 R X |

Primary Examiner—Edward K. Look
Assistant Examiner—Todd Mattingly
Attorney, Agent, or Firm—Leo H. McCormick; Ken C. Decker

[57] ABSTRACT

A spring and lever arrangement for imparting a spring force to a plunger of a control valve in a brake booster by operating a solenoid member during a brake application. Movement of the plunger by an operator input force allows a pressure differential to develop across a moveable wall and produce an original output force which is supplied to a pressurizing member. Resistance to movement of the pressurizing member creates a reaction force. The reaction force balances the spring force and operator input force to terminate the development of the pressure differential while correspondingly modifying the output force supplied to the pressurizing member. A switch allows an operator terminate the operation of the solenoid to effectively obviate the spring force and allow the original output force to be produced by the operator input force.

4 Claims, 2 Drawing Sheets

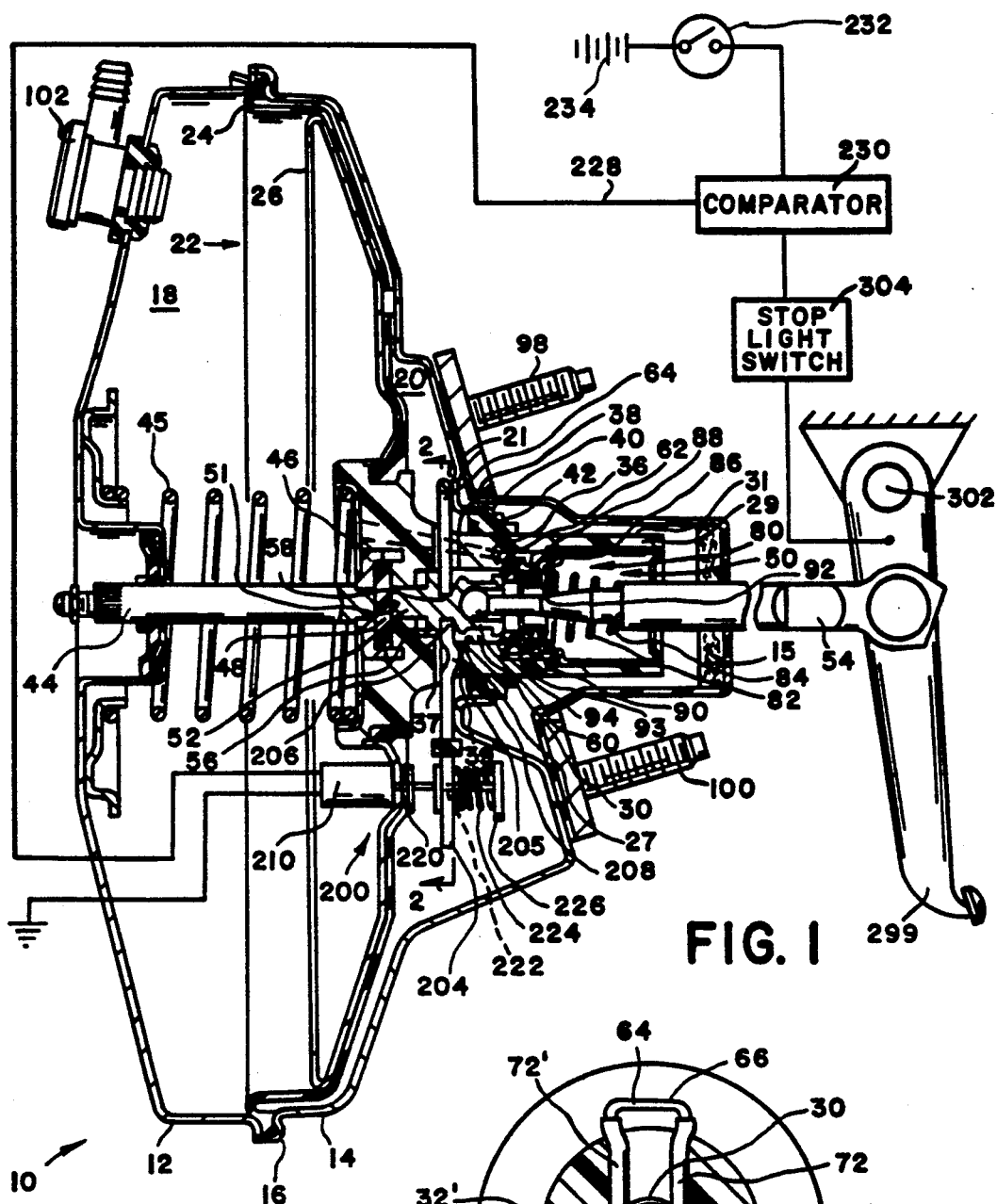
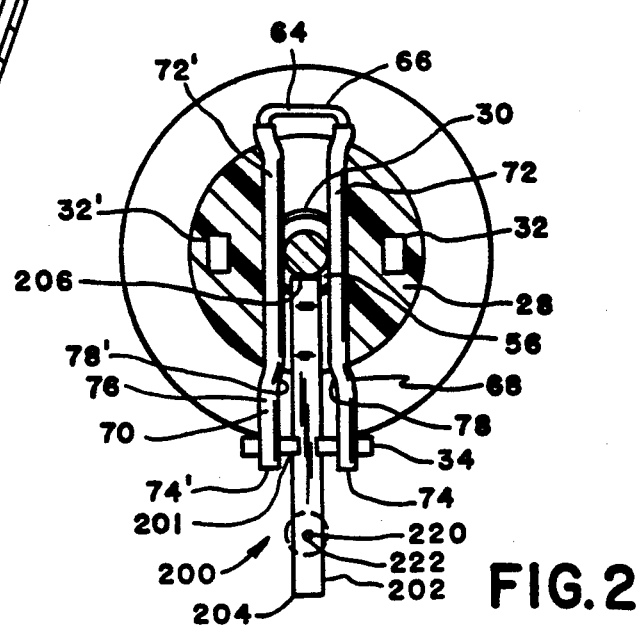

MODIFIER FOR VACUUM BOOSTER REACTION FORCE

This invention relates to a vacuum brake booster wherein the reaction force developed during a brake application is communicated through a reaction member to balance an operator input force is modified by a spring force to change the functional gain between input force and output force produced by the brake booster.

Traditionally, the output force developed in a vacuum brake booster is a linear function of an input force applied to the brake pedal. The input force applied to the brake pedal moves a plunger of a control valve to initially interrupt fluid communication between first and second chambers and thereafter allow a fluid to enter the first chamber to develop a pressure differential across a wall. The pressure differential acts on and moves the wall to develop the output force which is transmitted through a reaction member to an output member which correspondingly moves a piston in a master cylinder. The resistance of the piston to movement by the output force defines a reaction force which deforms the reaction member and balances the input force to establish the desired output force, U.S. Pat. No. 3,110,031 is a typical example of one such brake booster. Over the years many modification have been made to this type brake booster in an attempt to provide a better feel or a smoother operation during a brake application, such as changing the material in the reaction member by either making it harder or softer or as disclosed in U.S. Pat. No. 3,149,539 changing both the shape of the plunger and reaction member. However, even with all these changes, the resulting output force remains a linear function of the input force.

Recently the operational time required to effect the initiation of a brake application has been reduced by positioning a control valve in a brake booster in a ready or reset position by a key member to reduce the travel of a plunger by an input member as disclosed in U.S. Pat. No. 4,953,446. Consistent with traditional brake boosters, the resistance to movement developed by a piston in a master cylinder is transmitted through a reaction member to oppose the input force applied to move the plunger of the control valve. On further investigation of this vacuum brake booster, it has been determined that the operational time required to effect a brake application could be reduced through a modification of the relationship between the input force and output force.

In U.S. Pat. No. 5,161,451, a brake booster is disclosed having valve structure whereby a nonlinear relationship exists between an operator input force and output force. In this brake booster, a lever having a first end that engages a plunger in the control valve and a second end attached to a spring fixed to the shell of the booster imparts a variable input force during a brake application to create a nonlinear output as a function of the operator input force. The structure of this brake booster is adequate for many applications, however, under some conditions it may be desirable for an operator to be able to select a desired output force as a direct function of the input applied to operate the control valve.

In the present invention, a brake booster was developed having a means for selectively changing the functional relationship between an operator applied input force for producing an original output force and a modified output force having a different functional relationship from the same operator applied input force. In this brake booster, a plunger is located in a bore of a central hub of a movable wall. The plunger responds to an operator applied input force by moving in the bore from a rest position where the pressure level in a first chamber is substantially identical with the pressure level in a second chamber to an actuation position where air is communicated to the first chamber to create a pressure differential across the movable wall. The pressure differential acts on the movable wall and develops an original output force which is transmitted through a reaction member to an output member. The resistance to movement of a piston in the master cylinder by the original output force is transmitted back into the reaction member as a reaction force. The reaction force acts on reaction member to bring the reaction member into engagement with the plunger to oppose movement of the plunger and interrupt to continue communication of air to the first chamber. The original output force is a product of the operator applied input force and a constant $k_1$. Under some circumstances, an operator may desire to have the booster produce an output force which has a greater gain from the same operator applied input force. The present invention allows the operator to selectively convert a brake booster from what is termed a hard pedal feel to a soft pedal feel. This change occurs by diverting or absorbing a portion of the reaction force before it is communicated to balance the operational input force. A first switch controlled by an operator allows electrical energy to flow to a comparator in the converter system. The comparator is connected to receive the same signal that activates the stop lights when a brake application is initiated. The comparator is connected to supply a solenoid carried by the moveable wall with an actuation signal corresponding to the stop light actuation signal. Actuation of the solenoid positions a spring to supply a lever with a spring force. A lever which is located in the hub transmits the spring force to the plunger. The spring force is combined with the input force to hold the plunger in an actuation position until the reaction force is sufficient to overcome the combined force and thereafter moves the plunger to interrupt the communication of air to the first chamber. The resultant modified output force which is supplied to the pressurizing device is a product of the operator applied input force and a different constant $k_2$. Constant $k_2$ is larger than constant $k_1$ and as a result a larger output force is supplied to the pressurizing device by the same operator applied input force.

It is an object of this invention to provide a brake booster having means to selective change the gain or output force produced from the same operator applied input force.

It is a further object of this invention to provide a brake booster with a plunger in a control valve arrangement which is responsive to a spring force and an operator applied input force to control the development of an output force.

It is another object of this invention to provide a brake booster with a solenoid positioned lever means to communicate a spring force to a plunger during a brake application to control the development of an output force.

These objects and advantages should be apparent from reading this specification while viewing the drawings in which:

FIG. 1 is a schematic illustration of a brake booster with a solenoid responsive to an operator input for providing a plunger of a control valve with a spring force input which is combined with an operator applied input to change the development of an operational output force according to the principles of this invention;

FIG. 2 is a sectional view taken along lines 2—2 of FIG. 1;

Figure 3:
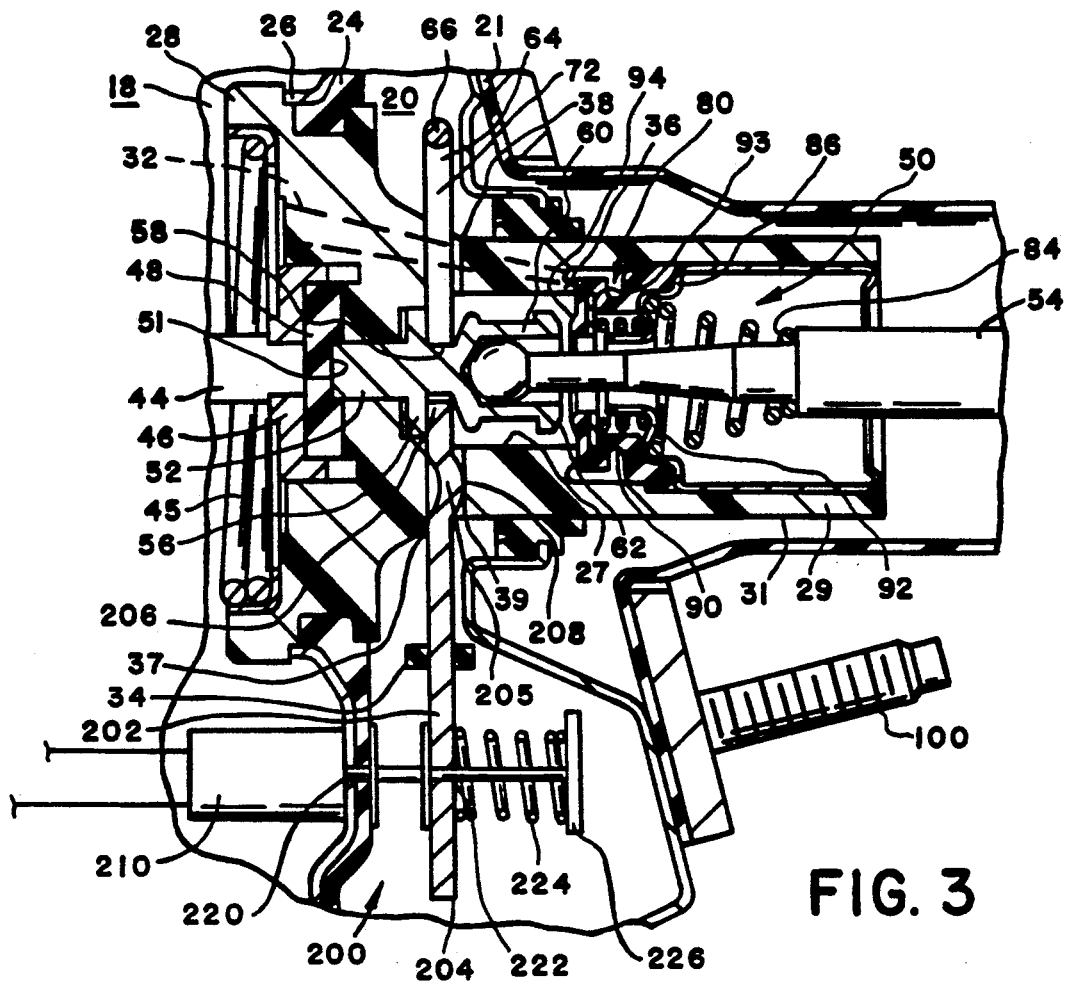
FIG. 3 is a schematic illustration of a portion of the brake booster of FIG. 1 wherein the plunger of the control valve is in an actuation position.

The servomotor 10 shown in FIG. 1 is designed to supply a master cylinder or other pressurizing device in a brake system with an operational force to effect a brake application. The servomotor 10 is designed to be quiet, efficient and provide an immediate response to an input force to develop a linear output force for effectively operating the master cylinder. The speed at which the linear output force is developed can be selectively chosen by an operator to meet a desired pedal feel.

The servomotor 10 has a front shell 12 joined to a rear shell 14 by a series of lances and tabs 16 to form a sealed housing. The interior of the sealed housing is divided into a front chamber 18 and a rear chamber 20 by a movable wall 22. The movable wall 22 includes a diaphragm 24, backing plate 26 and a hub 28. Hub 28 has a cylindrical body 29 with a stepped bore 30 that extends therethrough,.a plurality of passages 32 and 32' extend to an annular vacuum seat 36, and a radial slot 38. The cylindrical body 29 extends through an opening 40 in the rear shell 14 to communicate air from the surrounding environment into bore 30. A seal 42 of the type disclosed in U.S. Pat. No. 4,898,081, which is located between opening 40 and the exterior surface 31 on the cylindrical projection 29, seals chamber 20 from the surrounding environment.

An output push rod 44 has a head 46 that encloses reaction disc 48 located in the stepped bore 30. The output push rod 44 engages a piston in the master cylinder.

A control valve 50 located in bore 30 has a Plunger 52 connected to an input, push rod 54 attached to a brake pedal 299. Brake pedal 299 which pivots about pin 302 is connected to a stop light switch 304. Plunger 52 has first flange 56 that engages a bearing surface on hub 28 in bore 30, a groove 58, a contoured second flange 60 and a tapered atmospheric seat 62 located of the end thereof.

A key member 64 made of a cylindrical wire that is bent into the shape as best shown in FIG. 2 has a base member 66 with legs 68 and 70 that extend therefrom. Each leg 68 and 70 has a central section 72, 72' and an end section 74, 74'. Thereafter, a rubber or plastic coating 76 is placed around the key member 64.

The key member 64 which is inserted in slot 38 holds plunger 52 in bore 30. During the insertion into slot 38, legs 68 and 70 of key member 64 are initially pinched together until tangents 78, 78' engage groove 58 on plunger 52. Thereafter, legs 68 and 70 expand as central sections 72, 72' move into the cylindrical body 29 and later fully expand to lock the key member 64 in the cylindrical body 29 as shown in FIG. 2. Thereafter a retainer 34 is attached to ends 68 and 70.

The resilient arrangement 200, which includes lever 202 and solenoid member 210, selectively provides Plunger 52 with a linear input during a brake application. Lever 202 has a first end 204 separated from a second end 206 by a contact point 205 that engages a fulcrum 208 on cylindrical body 29. Resilient retainer 34 is located in groove 201 on lever 202. Resilient retainer 34 assures that end 206 is located in bore 30 adjacent flange 56 on plunger 52. The solenoid member 210 extends through backing plate 26 and is attached hub 28 of the movable wall 22. The solenoid member 210 has a plunger 220 that extends through an opening 222 in the second end 204 of lever 202. A spring 224 has a first end attached to lever 202 and a second end attached to cap 226 of plunger 220.

Solenoid member 210 is connected by lead 228 to a comparator 230 which receives an operational signal from the stop light switch 304. A switch 232 located on the dash of the vehicle is selectively set by an operator to allow an electrical energy from source 234 to be communicated to comparator 230.

Prior to the insertion of the plunger 52 into bore 30, poppet valve 80 is attached to the push rod 54. Poppet valve 80 includes a return spring 82 and a flexible member 90. Return spring 82 has a first end located on shoulder 84 of the push rod 54 and a second end that engages retainer 86. A bead 88 on a first end of the flexible section 90 is held against a shoulder on the cylindrical body 29 by retainer 86 while a valve face 94 on disc 93 on a second end is urged toward annular vacuum seat 36 by valve spring 92 connected to retainer 86. On insertion of the plunger 52 into bore 30, retainer 86 holds bead 88 against shoulder 95 such that in the rest position return spring 82 acts on push rod 54 and valve spring 92 seat face 94 on atmospheric seat 62 to seal at least portion 31 of the bore 30 from the surrounding atmosphere.

The servomotor 10 is installed in a vehicle through mounting bolts 98 and 100 and push rod 54 is attached to the brake pedal 299 of the vehicle. Check valve 102 in the front shell 12 is connected to the intake manifold of an internal combustion engine in a vehicle. When the engine is operating, vacuum present at the intake manifold evacuates air from booster 10. An evacuation pressure differential acts on plunger 52 to move face 94 away from vacuum seat 36 to allow any air present in chamber 20 to be evacuated into chamber 18 via bore section 27, slot 38 and passages 32, 32'. When the fluid pressure in chambers 18 and 20 equalizes, valve spring 92 moves plunger 52 to again position face 94 on vacuum seat 36 and to isolate chamber 20 from chamber 18 with the control valve 50 in the rest position as shown in FIG. 1.

The operator has the option of activating the solenoid member 210 to modify the development of the operational output from the brake booster 10. If the operator desires to have the brake booster 10 create an output force in a manner which is termed "hard pedal", switch 232 is moved to a position which prevents electrical current from flowing from source 234 to comparator 230. In this state when an operational signal is communicated from stop light, the comparator 304 does not communicate an operational signal to solenoid member 210. The inactivated solenoid member 210 moves with the movable wall 22 and therefor does not provide lever 202 with a spring input force. In response to an input force applied to push rod 54, control valve 50 is moved to an operational position as shown in FIG. 3 to effect a brake application. In the actuation position, plunger 52 immediately moves atmospheric seat 62 away from face 94 to allow air to flow through filter 15 into bore 30 for presentation to chamber 20. With air in chamber 20 and vacuum in chamber 18, a pressure differential is created across wall 22. The pressure differential acts on wall 22 to produce an output force which is transferred from hub 28 through reaction disc 48 to push rod 44. Initially, the output force overcomes return spring 45 to supply pistons in the master cylinder with an actuation force. The output force produced from this input force is illustrated by curve 301 in FIG. 4.

Figure 4:
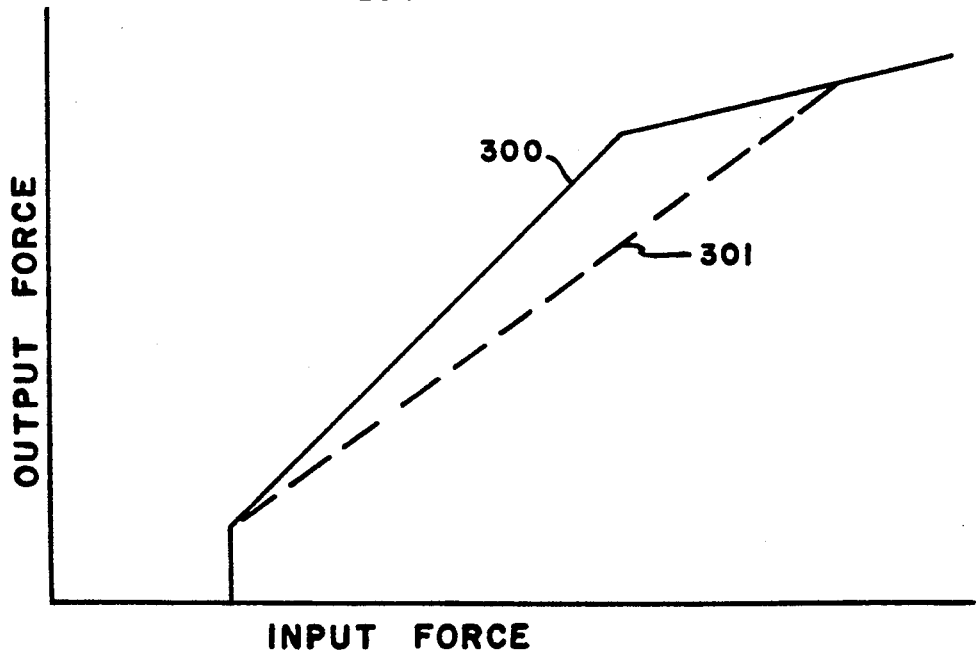
FIG. 4 is a graph illustrating the relationship between an input force and an output force during a brake application with the solenoid activated and unactivated.

Should an operator desire to have the operational output force develop at a faster rate, switch 232 is moved to a position which is termed "soft pedal". In this Position, electrical current flows from source 234 to comparator 230. With which 232 closed, the brake actuation signal supplied from stop light switch 304 to the comparator 230 allows electrical current to flow to solenoid member 210. With solenoid member 210 actuated, plunger 220 moves to place spring 224 in tension such that a spring force is transmitted from end 204 of lever 202 to end 206 as a function of the ratio of the respective distances from fulcrum 205. This spring force which is linear is combined with the operator applied input force to push rod 54 to effect a brake application. As described above, plunger 52 moves to allow air to flow to chamber 20 and create a pressures differential across wall 22. This pressure differential is communicated through reaction disc 48 to output push rod 44 and supplied to the master cylinder. The resistance to movement of the pistons in the master cylinder create a reaction force which is transmitted to the reaction member 48. The reaction force deforms the reaction member 48 and brings the reaction member 48 into contact with face 51 on plunger 52. The reaction force acts through the plunger 52 to counter the input force supplied by the operator through push rod 54 and the spring force applied to the plunger 52 by lever arrangement 200. Curve 300 in FIG. 4 illustrates the development of an output force produced by brake booster 10 in response to an input force. When the reaction force developed as a result of the output force balances with the combined forces of the input force and spring force applied by lever arrangement 200, any additional reaction force moves the plunger 52 to bring atmospheric seat 62 on plunger 52 into engagement with face 94 face on the poppet valve 80 to terminate the communication of air to chamber 20.

As shown in FIG. 4, curve 300 illustrates the development of an output force wherein the gain produced from the input force is at a faster rate than that developed by a standard or conventional brake booster. The modified output force is the product of the input force applied to brake pedal 299 and a second constant $k_2$. Thus, an operator can selectively choose the operation of brake booster 10 in developing a larger output force from the same input force over an initial time period.

On termination of the input force on push rod 54, return spring 82 moves plunger 52 toward a release position. In the release position, atmospheric seat 62 engages face 94 on poppet valve to prevent the communication of air through bore 30. At the same time, flange 56 on plunger 52 engages central segments 72, 72' on key member 64 to move key member 64 into engagement with the bottom 39 of slot 38 to define a full release position whereby air is now evacuated from chamber 20 to chamber 18, via slot 38, bore section 31 and passages 32, 32', to equalize the fluid pressure therebetween. As wall 22 approaches the rear shell 14, the base section 66 and end members 74, 74' of the key member 64 engages an arcuate stop 21 on the rear shell 14 to hold plunger 50 stationary as the hub 28 while wall 22 continues to move toward the rear shell 14 by the force of the return spring 45. The size of the plurality of openings 32, 32' and the slot 38 is such that the fluid pressure in chambers 20 and 18 is substantially identical when the key member 64 engages an arcuate stop 21. As the hub 28 continues to move toward the rear shell 14, key member 64 moves in slot 38 such that when wall 22 reaches its rest position, central sections 72, 72' engage the top 37 of slot 38. With the key member 64 positioned at the top 37 of the slot 38, valve spring 92 seats face 94 on vacuum seat 36 to inhibit fluid communication between chambers 18 and 20. On termination of the input force on brake pedal 299, the operational signal supplied to the stop light switch terminates and the corresponding signal to comparator 230 is interrupted such that electrical current to solenoid member 210 is also interrupted. With the current to solenoid member interrupted, plunger 220 moves into the deactivated position to take the tension off spring 224 such the spring force communicated through end 206 of lever 202 is removed from the system and control valve 50 returned to the ready position illustrated in FIG. 1. In the ready position control valve 50 is capable of an immediate response to an input force applied to push rod 54 to allow air to be presented to chamber 20 to begin the development of a pressure differential from which an output force develops as a product of an input force and a constant $k_1$ or $k_2$ selected by an operator to effect a desired brake application.

I claim:

1. In a brake booster having a plunger located in a bore in a hub of a movable wall and responsive to an operator input force for controlling the flow of a first fluid to a first chamber to create a pressure differential with a second fluid in a second chamber, said pressure differential acting on the movable wall to develop an original output force that is transmitted through a reaction member to an output member for moving a pressurizing device to effect a desired brake application, said pressurizing device resisting movement by the original output force to develop a reaction force which is transmitted back through the reaction member to oppose and balance the operator input force and terminate the communication of the first fluid to said first chamber to terminate the development of said pressure differential, said original output force being a linear function of the operator input force, the improvement comprising:

a lever having a first end and a second end, said lever engaging a fulcrum on said hub to define a ratio of the distances between the first and second ends and the fulcrum, said first end engaging said plunger;

resilient means connected to said second end; and a solenoid carried by said moveable wall and responsive to an operational signal generated on initiation of a brake application for positioning said second end of said lever to provide said first end with a spring force from said resilient means, said spring force being combined with said operator input force during a brake application, said reaction force balancing said spring force and operator input force to produce a modified output force which is supplied to operate said pressurizing device, said modified operational output force being a function of said operational input force and having a greater gain than said original output force.

2. In a brake booster as recited in claim 1 further including a first switch means for allowing an operator to select either the development of an original output force or a modified output force.

3. In a brake booster as recited in claim 1 further including:
    second switch means connected to said first switch means and responsive to an electrical signal for activating a stop light during a brake application for activating said solenoid.

4. In the brake booster as recited in claim 3 further including:
    key means for retaining said plunger in said bore to limit the movement of the plunger by the reaction force and for providing guidance to maintain said lever in the same axial plane as the movable wall to assure, that said first end engages said plunger.

* * * * *